(12) United States Patent
Schumacher et al.

(10) Patent No.: US 12,421,344 B2
(45) Date of Patent: Sep. 23, 2025

(54) COMPOSITE FOILS BIODISINTEGRATABLE AT HOME COMPOST CONDITIONS

(71) Applicant: BASF SE, Ludwigshafen am Rhein (DE)

(72) Inventors: Karl-Heinz Schumacher, Ludwigshafen am Rhein (DE); Ulrike Licht, Ludwigshafen am Rhein (DE); Ines Pietsch, Ludwigshafen am Rhein (DE); Lars Heckhoff, Ludwigshafen am Rhein (DE)

(73) Assignee: BASF SE, Ludwigshafen am Rhein (DE)

(*) Notice: Subject to any disclaimer, the term of this patent is extended or adjusted under 35 U.S.C. 154(b) by 334 days.

(21) Appl. No.: 17/908,252

(22) PCT Filed: Feb. 24, 2021

(86) PCT No.: PCT/EP2021/054570
§ 371 (c)(1),
(2) Date: Aug. 31, 2022

(87) PCT Pub. No.: WO2021/175676
PCT Pub. Date: Sep. 10, 2021

(65) Prior Publication Data
US 2023/0092087 A1 Mar. 23, 2023

(30) Foreign Application Priority Data
Mar. 2, 2020 (EP) .................................... 20160462

(51) Int. Cl.
C08G 18/08 (2006.01)
C08G 18/42 (2006.01)

(52) U.S. Cl.
CPC ...... *C08G 18/0804* (2013.01); *C08G 18/4238* (2013.01); *C08G 2170/80* (2013.01); *C08G 2230/00* (2013.01)

(58) Field of Classification Search
CPC ............ C08G 18/0804; C08G 18/4238; C08G 2170/80; C08G 2230/00; B32B 37/12; B32B 2307/7163; B32B 2439/70
(Continued)

(56) References Cited

U.S. PATENT DOCUMENTS 3,412,054 A 11/1968 Milligan et al.
3,905,929 A 9/1975 Noll
(Continued)

FOREIGN PATENT DOCUMENTS

CA 1129128 A 8/1982
CN 104119830 A 10/2014
(Continued)

OTHER PUBLICATIONS

International Preliminary Report on Patentability received for PCT Patent Application No. PCT/EP2021/054570, mailed on Jun. 21, 2021, 9 pages.

*Primary Examiner* — John L Goff, II
(74) *Attorney, Agent, or Firm* — Faegre Drinker Biddle & Reath LLP

(57) ABSTRACT

The use of an aqueous polyurethane dispersion adhesive is described for producing composite foils which are biodisintegratable at home compost conditions where at least two substrates are adhesive-bonded to one another with use of the polyurethane dispersion adhesive, where at least one of the substrates is a polymer foil which is biodisintegratable at home compost conditions. At least 60% by weight of the polyurethane is composed of diisocyanates, polyesterdiols, and at least one bifunctional carboxylic acid selected from dihydroxy carboxylic acids and diamino carboxylic acids, wherein the polyurethane has no melting point above 20° C. or wherein the polyurethane has a melting point above 20°
(Continued)

Figure 1:
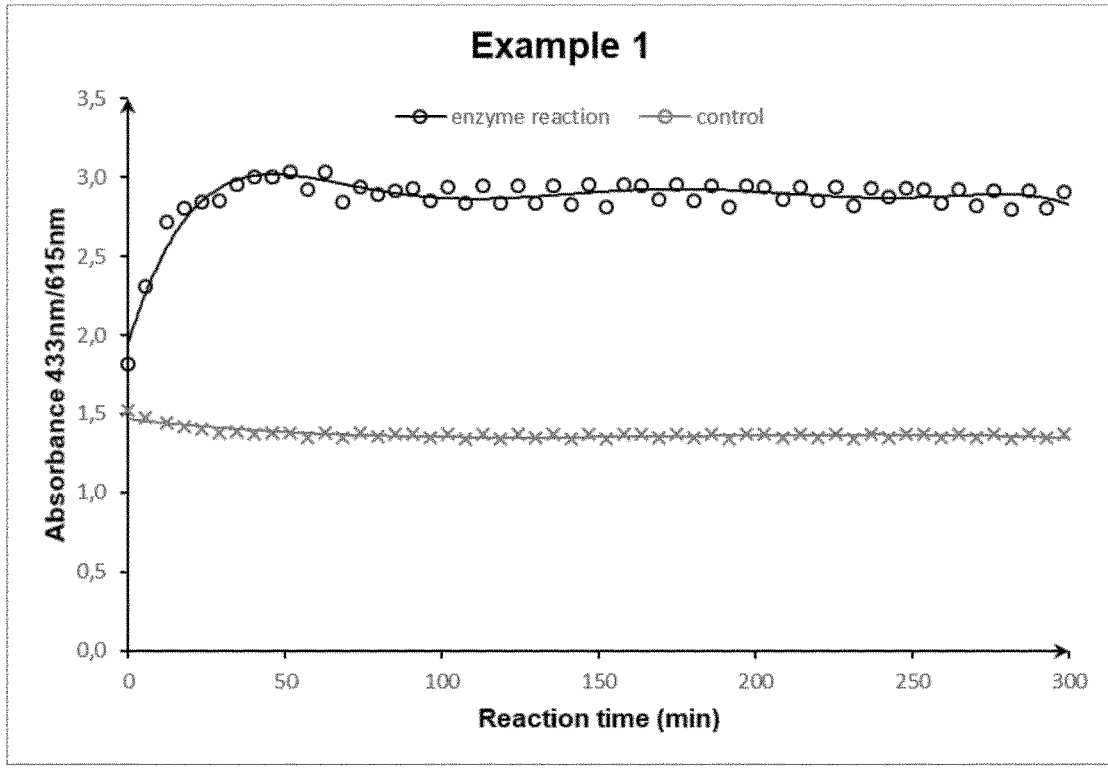

C. with an enthalpy of fusion lower than 10 J/g, and wherein a film of the polyurethane adhesive is biodegradable at home compost conditions.

12 Claims, 3 Drawing Sheets

(58) Field of Classification Search
USPC .................................................... 156/331.7
See application file for complete search history.

(56) References Cited

U.S. PATENT DOCUMENTS

| | | |
|---|---|---|
| 3,920,598 A | 11/1975 | Reiff et al. |
| 4,192,937 A | 3/1980 | Nachtkamp et al. |
| 4,269,748 A | 5/1981 | Nachtkamp et al. |
| 4,292,226 A | 9/1981 | Wenzel et al. |
| 2012/0077044 A1 | 3/2012 | Beyers et al. |
| 2017/0247587 A1 * | 8/2017 | Ma .................... C08G 18/4211 |

FOREIGN PATENT DOCUMENTS

| | | | | |
|---|---|---|---|---|
| DE | 1495745 A1 | | 6/1969 | |
| DE | 2034479 A1 | | 1/1972 | |
| GB | 2539493 A | * | 12/2016 | ......... B32B 37/0084 |
| WO | 2006/087348 A1 | | 8/2006 | |
| WO | 2010/034712 A1 | | 4/2010 | |
| WO | 2012/013506 A1 | | 2/2012 | |
| WO | 2013/083456 A1 | | 6/2013 | |

* cited by examiner

COMPOSITE FOILS BIODISINTEGRATABLE AT HOME COMPOST CONDITIONS

CROSS-REFERENCE TO RELATED APPLICATIONS

This application is a national stage application (under 35 U.S.C. § 371) of PCT/EP2021/054570, filed Feb. 24, 2021, which claims benefit of European Application No. 20160462.6, filed Mar. 2, 2020, both of which are incorporated herein by reference in their entirety.

The invention relates to the use of an aqueous polyurethane dispersion adhesive for producing composite foils which are biodisintegratable at home compost conditions. The invention also relates to a process for producing the composite foils and to the composite foils produced by the process.

Flexible packaging is often composed of composite foils adhesive-bonded to one another by a suitable adhesive, where at least one of the foils bonded to one another is a polymer foil. There is high demand for biodegradable composite-foil packaging, which can be disposed of by composting after use.

The major challenge consists in providing materials which have the necessary functionality and stability but which when subject to stimulation from a bioactive environment, are degraded or decomposed with high rapidity and to a high extent. The trigger for the degradation process can be microbiological, hydrolytic, or oxidative degradation at a specific site within the main chain of a polymer. All of the degradation products should exhibit maximum safety and minimum toxicity and without accumulation within the natural environment, and this means that they should be subject to preferably complete and final microbial degradation. The adhesive used for the adhesive-bonding of the foils also has an effect on biodisintegratability of the composite foil. The adhesive is intended firstly to provide a stable adhesive bond but secondly also to promote degradability, i.e. disintegration of the foil composite. It is extremely difficult to achieve simultaneous compliance with, and optimization of, these fundamentally contradictory requirements.

WO 2012/013506 describes the use of an aqueous polyurethane dispersion adhesive for making biodisintegratable composite foils, wherein at least two substrates are adhesively bonded by use of the polyurethane dispersion adhesive and wherein at least one of the substrates is a biodisintegratable polymer foil. The polyurethane is made of at least 60% by weight of diisocyanates, polyesterdiols and at least one bifunctional carboxylic acid selected from dihydroxy carboxylic acids and diamino carboxylic acids.

The biodisintegratability described in WO 2012/013506 remains unsatisfactory in some aspects. Although the complete biological degradation of the laminates is well achieved under composting conditions including composting temperature above 50° C., which are typical for conditions in industrial composting facilities, the biological degradation into carbon dioxide and water is much slower under home composting conditions, e.g. in a private garden, where temperatures above 50° C. are typically not achieved.

The object consisted in providing further materials for biodegradable or home compostable composite foils, in particular for flexible packaging, where these can be easily produced and have high quality of adhesive properties, and also simultaneously have rapid biodisintegratability under home composting conditions, i.e. at 25±5° C.

It has been found that the object can be achieved via use of the aqueous polyurethane adhesive dispersions described below.

The invention provides the use of an aqueous polyurethane dispersion adhesive for producing composite foils which are biodisintegratable at home compost conditions (25±5° C.), where at least one first substrate is adhesive-bonded to at least one second substrate with use of the polyurethane dispersion adhesive, where at least one of the substrates is a polymer foil which is biodisintegratable under home compost conditions, and where at least 60% by weight of the polyurethane is composed of
  (a) at least one diisocyanate,
  (b) at least one polyesterdiol, and
  (c) at least one bifunctional carboxylic acid selected from dihydroxycarboxylic acids and diaminocarboxylic acids;

wherein the polyurethane has a glass transition temperature below 20° C. and either has no melting point above 20° C. or has a melting point above 20° C. with an enthalpy of fusion lower than 10 J/g, and wherein a film of the polyurethane adhesive decomposes at home compost conditions to more than 90% by weight into $CO_2$ and water within 360 days; and wherein the film of the polyurethane adhesive preferably is home compostable, wherein a material is biodisintegratable at home compost conditions if at most 10% of the original dry weight of the material is found to be present after aerobic composting at 25±5° C. for a period of at most 180 days in a sieve fraction >2 mm.

Preferably, a film of the polyurethane adhesive and/or the first and second substrates and/or the composite foil is home compostable.

A material is home compostable if it is biodisintegratable at home compost conditions (ambient temperature of 25±5° C.) and if it decomposes at home compost conditions to more than 90% by weight into $CO_2$ and water within 360 days (based on Australian Standard® AS 5810-2010 "Biodegradable plastics—Biodegradable plastics suitable for home composting").

Decomposition into CO2 can be determined by aerobic degradation according to ISO 14855-1 (2012) in a controlled composting test but at ambient temperature (25±5° C.) to simulate home composting conditions instead of the prescribed temperature of 58° C., typical to simulate composting conditions in industrial composting facilities.

A material is biodisintegratable at home compost conditions if at most 10% of the original dry weight of the material is found to be present after aerobic composting for a period of at most 180 days in a sieve fraction >2 mm in a disintegration test environment at ambient temperature (25±5° C.). Biodisintegration can be tested according to ISO 20200, but at 25±5° C. for simulating home compost conditions.

The rate of biological degradation can be determined by quantitative analysis of the produced carbon dioxide.

Biodegradability is the ability of organic substances to be broken down by micro-organisms in the presence of oxygen (aerobic) to carbon dioxide, water, biomass and mineral salts or other elements that are present (mineralization). Composting is the aerobic degradation of organic matter to make compost. Home compost is the product of privately generated organic waste, such as food, garden and paper product waste, which has been subjected to composting, and which product is applied to private property soils, typically without commercial transactions.

The invention also provides a process for producing composite foils which are biodisintegratable at home compost conditions (25±5° C.) and which are preferably home compostable, said process comprises providing an aqueous polyurethane dispersion adhesive based on the polyurethanes to be used in the invention as described herein, and adhesive-bonding at least two substrates to one another with use of the aqueous polyurethane dispersion adhesive, where at least one of the substrates is a polymer foil which is biodisintegratable at home compost conditions and preferably home compostable.

The invention also provides composite foils produced by the process of the invention.

Glass transition temperatures are determined by Differential Scanning Calorimetrie (ASTM D 3418-08, "midpoint temperature" of second heating curve, heating rate 20 K/min).

The adhesive to be used in the invention contains (preferably consists essentially of) at least one polyurethane dispersed in water as polymeric binder, and optionally of added substances, such as fillers, thickeners, antifoam, etc. The polymeric binder preferably takes the form of dispersion in water or else in a mixture made of water and of water-soluble organic solvents with boiling points which are preferably below 150° C. (1 bar). Particular preference is given to water as sole solvent. The water or other solvents are not included in the calculation of weight data relating to the constitution of the adhesive.

The polyurethanes are preferably mainly composed of aliphatic polyisocyanates, in particular diisocyanates, on the one hand, and on the other hand of reactants which are preferably non-crystalline polyesterdiols, and also bifunctional carboxylic acids. It is preferable that the polyurethane is composed of at least 40% by weight, particularly at least 60% by weight, and very particularly at least 80% by weight, of diisocyanates, polyesterdiols, and bifunctional carboxylic acids.

The polyurethane is preferably amorphous. It is preferable that the polyurethane comprises an amount of more than 10% by weight, more than 50% by weight, or at least 80% by weight, based on the polyurethane, of aliphatic polyesterdiols.

The polyesterdiols are preferably made of at least 10 mol %, preferably at least 20 mol % or at least 30 mol % of branched aliphatic diols, based on the sum of diols used for making the polyesterdiol. Preferred branched aliphatic diols are neopentyl glycol, 3-methyl pentanediol, 2-methyl propanediol and hydroxypivalic acid neopentyl glycolester (3-hydroxy-2,2-dimethylpropyl 3-hydroxy-2,2-dimethylpropanoate). Most preferred branched aliphatic diol is neopentyl glycol.

The polyurethane is preferably composed of:
a) at least one diisocyanate, which preferably are aliphatic or cycloaliphatic,
b) at least one diol, where, of these,
   b1) from 10 to 100 mol %, based on the total amount of the diols (b), are polyesterdiols with a molar mass of from 500 to 5000 g/mol,
   b2) from 0 to 90 mol %, based on the total amount of the diols (b), have a molar mass of from 60 to 500 g/mol,
c) at least one bifunctional carboxylic acid selected from dihydroxycarboxylic acids and diaminocarboxylic acids, d) optionally other polyfunctional compounds which differ from the monomers (a) to (c) and which have reactive groups, where these are alcoholic hydroxy groups, primary or secondary amino groups, or isocyanate groups, and
e) optionally monofunctional compounds which differ from the monomers (a) to (d) and which have a reactive group which is an alcoholic hydroxy group, a primary or secondary amino group, or an isocyanate group.

Also preferred is a polyurethane which is composed of at least 60% by weight of
(a) at least one aliphatic diisocyanate,
(b) at least one aliphatic polyesterdiol,
(c) at least one bifunctional carboxylic acid selected from dihydroxycarboxylic acids and diaminocarboxylic acids, and
(d) at least one polyfunctional compound which differs from the monomers (a) to (c) and which has at least two reactive groups selected from primary and secondary amino groups.

Preferably, at least 80% by weight of the at least one polyesterdiol (b) is composed of at least one aliphatic dicarboxylic acid and of at least one aliphatic diol.

Monomers (a) that should particularly be mentioned are diisocyanates $X(NCO)_2$, where X is an aliphatic hydrocarbon radical having from 4 to 15 carbon atoms or a cycloaliphatic or aromatic hydrocarbon radical having from 6 to 15 carbon atoms, or an araliphatic hydrocarbon radical having from 7 to 15 carbon atoms, wherein the aliphatic and/or cycloaliphatic diisocyanates are preferred. Examples of these diisocyanates are tetramethylene diisocyanate, hexamethylene diisocyanate, dodecamethylene diisocyanate, 1,4-diisocyanatocyclohexane, 1-isocyanato-3,5,5-trimethyl-3-isocyanatomethylcyclohexane (IPDI), 2,2-bis(4-isocyanatocyclohexyl)propane, trimethylhexane diisocyanate, the isomers of bis(4-isocyanatocyclohexyl) methane (HMDI), e.g. the trans/trans, the cis/cis, and the cis/trans isomers, and also mixtures composed of said compounds. Examples of aromatic diisocyanates are 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI). Diisocyanates of this type are available commercially.

Mixtures of said isocyanates are for example the mixtures of the respective structural isomers of diisocyanatotoluene and diisocyanatodiphenylmethane, e.g. a mixture made of 80 mol % of 2,4-diisocyanatotoluene and 20 mol % of 2,6-diisocyanatotoluene; or mixtures of aromatic isocyanates such as 2,4-diisocyanatotoluene and/or 2,6-diisocyanatotoluene with aliphatic or cycloaliphatic isocyanates such as hexamethylene diisocyanate or IPDI, where the preferred mixing ratio of the aliphatic to aromatic isocyanates is from 4:1 to 1:4.

Most preferred is hexamethylene diisocyanate.

Other than the abovementioned compounds, other compounds that can be used in the structure of the polyurethanes are those which have, alongside the free isocyanate groups, other capped isocyanate groups, e.g. uretdione groups.

With a view to good film-formation and elasticity, diols (b) that can be used are mainly relatively high-molecular-weight diols (b1) which have a molar mass of about 500 to 5000 g/mol, preferably about 1000 to 3000 g/mol. This is the number-average molar mass Mn. Mn is calculated by determining the number of terminal groups (OH number).

The diols (b1) can be polyester polyols, where these are known by way of example from Ullmanns Enzyklopädie der technischen Chemie [Ullmann's encyclopedia of industrial chemistry], 4$^{th}$ edition, volume 19, pp. 62 to 65. It is preferable to use polyester polyols which are obtained via reaction of difunctional alcohols with difunctional carboxylic acids. Instead of the free polycarboxylic acids, it is also possible to use the corresponding polycarboxylic anhydrides or corresponding polycarboxylic esters of lower alcohols, or a mixture of these, to produce the polyester polyols. The polycarboxylic acids can be aliphatic, cycloaliphatic, araliphatic, aromatic, or heterocyclic, and can optionally have unsaturation and/or substitution, e.g. by halogen atoms. Examples that may be mentioned of these are: suberic acid, azelaic acid, phthalic acid, isophthalic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, and dimeric fatty acids. Preference is given to dicarboxylic acids of the general formula $HOOC—(CH_2)_y—COOH$, where y is a number from 1 to 20, preferably an even number from 2 to 20, examples being succinic acid, adipic acid, sebacic acid, and dodecane dicarboxylic acid.

Examples of polyfunctional alcohols that can be used are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes, such as 1,4-bis(hydroxymethyl)cyclohexane, 2-methyl-propane-1, 3-diol, methylpentanediols (for example 3-methyl pentanediol), hydroxypivalic acid neopentyl glycolester (3-hydroxy-2,2-dimethylpropyl 3-hydroxy-2,2-dimethylpropanoate) and also diethylene glycol, triethylene glycol, tetraethylene glycol, polyethylene glycol, dipropylene glycol, polypropylene glycol, dibutylene glycol, and polybutylene glycols. Preference is given to alcohols of the general formula $HO—(CH_2)_x—OH$, where x is a number from 1 to 20, preferably an even number from 2 to 20, in mixture with branched aliphatic diols, especially neopentyl glycol, wherein the amount of branched aliphatic diols is preferably at least 10 mol %, at least 25 mol % or at least 30 mol % of the total amount of diols.

It is optionally also possible to use polycarbonatediols as by way of example are obtainable via reaction of phosgene with an excess of the low-molecular-weight alcohols mentioned as structural components for the polyester polyols.

It is also possible to use lactone-based polyesterdiols, alone or in combination with the abovementioned polyesterdiols, where these are homo- or copolymers of lactones, preferably adducts which have terminal hydroxy groups and which are produced by addition reactions of lactones onto suitable difunctional starter molecules. Preferred lactones that can be used are those deriving from compounds of the general formula $HO—(CH_2)_z—COOH$, where z is a number from 1 to 20 and an H atom of a methylene unit can also have been replaced by a $C_1$-$C_4$-alkyl radical. Examples are epsilon-caprolactone, β-propiolactone, gamma-butyrolactone, and/or methyl-epsilon-caprolactone, and also mixtures of these. Examples of suitable starter components are the low-molecular-weight difunctional alcohols mentioned above as structural component for the polyester polyols. Particular preference is given to the corresponding polymers of epsilon-caprolactone. Lower polyesterdiols or polyetherdiols can also be used as starters for producing the lactone polymers. Instead of the polymers of lactones, it is also possible to use the corresponding, chemically equivalent polycondensates of the hydroxycarboxylic acids that correspond to the lactones.

In addition to the polyesterdiols, it is also optionally possible to make concomitant use of polyetherdiols. Polyetherdiols are in particular obtainable via polymerization of ethylene oxide, propylene oxide, butylene oxide, tetrahydrofuran, styrene oxide, or epichlorohydrin with themselves, e.g. in the presence of $BF_3$, or via an addition reaction of said compounds, optionally in a mixture or in succession, onto starter components having reactive hydrogen atoms, e.g. alcohols or amines, examples being water, ethylene glycol, propane-1,2-diol, propane-1,3-diol, 2,2-bis(4-hydroxyphenyl)propane, or aniline. Examples of polyetherdiols are polypropylene oxide and polytetrahydrofuran with molar mass from 240 to 5000 g/mol, and especially from 500 to 4500 g/mol. However, it is preferable that no polyetherdiols are used as structural component for the polyurethanes.

It is also optionally possible to make concomitant use of polyhydroxyolefins, preferably those having 2 terminal hydroxy groups, e.g. α,ω-dihydroxypolybutadiene, α,ω-dihydroxypolymeth-acrylate, or α,ω-dihydroxypolyacrylate. Other suitable polyols are polyacetals, polysiloxanes, and alkyd resins.

It is preferable that at least 95 mol % or 100 mol % of the diols $b_1$) are polyesterdiols. It is particularly preferable that diols $b_1$) used comprise exclusively polyesterdiols. The polyesterdiols preferably consist of only aliphatic and/or cycloaliphatic components.

Preferably, the polyurethane is made of at least 50% by weight, more preferably of at least 85% by weight or of at least 95% by weight or of 100% by weight, based on all polyhydroxy compounds, of polyesterdiols.

The hardness and the modulus of elasticity of the polyurethanes can be increased if diols (b) used also comprise, alongside the diols ($b_1$), low-molar-mass diols ($b_2$) with molar mass about 60 to 500 g/mol, preferably from 62 to 200 g/mol. Monomers (b2) used are especially the structural components of the short-chain alkanediols mentioned for the production of polyester polyols, where preference is given to the unbranched diols having from 2 to 12 carbon atoms and having an even number of carbon atoms, and also pentane-1,5-diol and neopentyl glycol.

Examples of diols $b_2$) that can be used are ethylene glycol, propane-1,2-diol, propane-1,3-diol, butane-1,3-diol, butene-1,4-diol, butyne-1,4-diol, pentane-1,5-diol, neopentyl glycol, bis-(hydroxymethyl)cyclohexanes, such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula $HO—(CH_2)_x—OH$, where x is a number from 1 to 20, preferably an even number from 2 to 20. Examples here are ethylene glycol, butane-1,4-diol, hexane-1,6-diol, octane-1,8-diol, and dodecane-1,12-diol. Preference is further given to neopentyl glycol.

It is preferable that the proportion of the diols ($b_1$), based on the total amount of the diols (b), is from 10 to 100 mol % or from 60 to 100 mol %, and that the proportion of the monomers ($b_2$), based on the total amount of the diols (b), is from 0 to 90 mol %, or from 0 to 40 mol %.

In order to achieve the water-dispersibility of the polyurethanes and to improve biodegradability, the polyurethanes comprise at least one bifunctional carboxylic acid selected from dihydroxycarboxylic acids and diaminocarboxylic acids. It is optionally also possible to make additional use of hydrophilic structural components which promote dispersibility and which bear at least one isocyanate group or at least one group reactive toward isocyanate groups, and moreover at least one hydrophilic group, or one group which can be converted to a hydrophilic group. In the text hereinafter, the "hydrophilic groups or potentially hydrophilic groups" is abbreviated to "(potentially) hydrophilic groups". When compared with the functional groups of the monomers that are used to construct the main chain of the polymer, the (potentially) hydrophilic groups are substantially slower to react with isocyanates.

The proportion of the components having (potentially) hydrophilic groups, based on the total amount of components (a) to (e), is generally judged in such a way that the molar amount of the (potentially) hydrophilic groups, based on the total amount of all of the monomers (a) to (e), is from 30 to 1000 mmol/kg, preferably from 50 to 500 mmol/kg, and particularly preferably from 80 to 300 mmol/kg. The (potentially) hydrophilic groups can be nonionic or preferably (potentially) ionic hydrophilic groups. Particular nonionic hydrophilic groups that can be used are in the form of polyethylene glycol ethers preferably made of from 5 to 100 repeat ethylene oxide units, with preference from 10 to 80 repeat ethylene oxide units. The content of polyethylene oxide units is generally from 0 to 10% by weight, preferably from 0 to 6% by weight, based on the total amount of all of the monomers (a) to (e). Examples of monomers having nonionic hydrophilic groups are polyethylene oxide diols using at least 20% by weight of ethylene oxide, polyethylene oxide monools, and also the reaction products of a polyethylene glycol and of a diisocyanate, where these bear an etherified terminal polyethylene glycol radical. Diisocyanates of this type, and also processes for their production, are given in the patent specifications U.S. Pat. Nos. 3,905,929 and 3,920,598.

The bifunctional carboxylic acid used usually comprises aliphatic, cycloaliphatic, araliphatic, or aromatic carboxylic acids, where these bear at least two hydroxy groups or two primary or secondary amino groups. Preference is given to dihydroxyalkylcarboxylic acids, especially those having from 3 to 10 carbon atoms, as are also described in U.S. Pat. No. 3,412,054. Particular preference is given to compounds of the general formula $(c_1)$

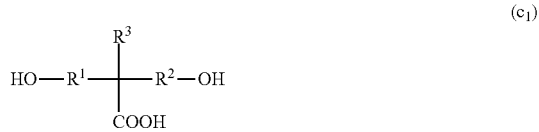

$(c_1)$ in which $R^1$ and $R^2$ are a $C_1$-$C_4$-alkanediyl group, and $R^3$ is a $C_1$-$C_4$-alkyl group, and especially to dimethylolpropionic acid (DMPA).

Monomers (c) which can be used and which have amino groups reactive toward isocyanates are diaminocarboxylic acids, or the adducts which are mentioned in DE-A 2034479 and which derive from an addition reaction of aliphatic diprimary diamines onto alpha,beta-unsaturated carboxylic acids. Compounds of this type comply by way of example with the formula $(c_2)$

$(c_2)$ where $R^4$ and $R^5$, independently of one another, are a $C_1$-$C_6$-alkanediyl group, preferably ethylene, and X is COOH. Particularly preferred compounds of the formula $(c_2)$ are N-(2-aminoethyl)-2-aminoethanecarboxylic acid and the corresponding alkali metal salts, Mere Na is particularly preferred as counterion.

Alongside the bifunctional carboxylic acids, other monomers having hydrophilic groups can optionally also be used, examples being appropriate dihydroxysulfonic acids and dihydroxy-phosphonic acids, such as 2,3-dihydroxypropanephosphonic acid, or diaminosulfonic acids. However, it is preferable not to use any bifunctional sulfonic acids or phosphonic acids.

Ionic hydrophilic groups are especially anionic groups such as the sulfonate group, the carboxylate group, and the phosphate group, in the form of their alkali metal salts or ammonium salts, and also cationic groups, such as ammonium groups, in particular protonated tertiary amino groups, or quaternary ammonium groups. Potentially ionic hydrophilic groups are especially those which can be converted into the abovementioned ionic hydrophilic groups via simple neutralization, hydrolysis, or quaternization reactions, therefore being by way of example carboxylic acid groups or tertiary amino groups. (Potentially) ionic monomers are described by way of example in Ullmanns Enzyklopadie der technischen Chemie [Ullmann's encyclopedia of industrial chemistry], $4^{th}$ edition, volume 19, pp. 311-313, and by way of example in DE-A 1 495 745, in detail.

(Potentially) cationic monomers (c) that are of particular practical importance are especially monomers having tertiary amino groups, examples being: tris(hydroxyalkyl)amines, N,N'-bis-(hydroxyalkyl)alkylamines, N-hydroxyalkyldialkylamines, tris(aminoalkyl)amines, N,N'-bis(aminoalkyl)alkylamines, and N-aminoalkyldialkylamines, where the alkyl radicals and alkanediyl units of said tertiary amines are composed independently of one another of from 1 to 6 carbon atoms. Other compounds that can be used are polyethers having tertiary nitrogen atoms and preferably having two terminal hydroxy groups, for example those accessible in a manner which is conventional per se via alkoxylation of amines having two hydrogen atoms bonded to amine nitrogen, e.g. methylamine, aniline, or N,N'-dimethylhydrazine. The molar mass of polyethers of this type is generally from 500 to 6000 g/mol. Said tertiary amines are converted to the ammonium salts either with acids, preferably strong mineral acids, such as phosphoric acid, sulfuric acid, hydrohalic acids, or strong organic acids, or via reaction with suitable quaternizing agents, such as $C_1$-$C_6$-alkyl halides or benzyl halides, e.g. bromides or chlorides.

To the extent that monomers having potentially ionic groups are used, the conversion of these to the ionic form can take place prior to, during, or preferably after the isocyanate polyaddition reaction, since the ionic monomers are often only sparingly soluble in the reaction mixture. It is particularly preferable that the carboxylate groups are present in the form of their salts with an alkali metal ion or ammonium ion as counterion.

The monomers (d) which differ from the monomers (a) to (c) and which optionally are also constituents of the polyurethane are generally used for crosslinking or for chain extension. They are generally nonphenolic alcohols of functionality more than two, amines having 2 or more primary and/or secondary amino groups, or else compounds which have not only one or more alcoholic hydroxy groups but also one or more primary and/or secondary amino groups. Examples of alcohols which have functionality higher than 2 and which can be used to adjust to a certain degree of branching or of crosslinking are trimethylolpropane, glycerol, or sugars. Monoalcohols can also be used where these bear not only the hydroxy group but also another group reactive toward isocyanates, examples being monoalcohols having one or more primary and/or secondary amino groups, e.g. monoethanolamine.

Polyamines having 2 or more primary and/or secondary amino groups are used especially when the chain extension and, respectively, crosslinking reaction is intended to take place in the presence of water, since the speed of reaction of amines with isocyanates is generally greater than that of alcohols or water. This is frequently a requirement when aqueous dispersions of crosslinked polyurethanes or polyurethanes with high molecular weight are desired. In such cases, the procedure is to produce prepolymers having isocyanate groups, to disperse these rapidly in water, and then to subject them to chain-extension or crosslinking via addition of compounds having a plurality of amino groups reactive toward isocyanates. Amines suitable for this purpose are generally polyfunctional amines in the molar-mass range from 32 to 500 g/mol, preferably from 60 to 300 g/mol, where these comprise at least two amino groups selected from the group of the primary and secondary amino groups. Examples here are diamines, such as diaminoethane, diaminopropanes, diaminobutanes, diaminohexanes, piperazine, 2,5-dimethyl-piperazine, 1-amino-3-(aminomethyl)-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate, or triamines, such as diethylenetriamine or 1,8-diamino aminomethyloctane.

The amines can also be used in capped form, e.g. in the form of the corresponding ketimines (see, for example, CA-A 1 129 128), ketazines (cf., for example, U.S. Pat. No. 4,269,748), or amine salts (see U.S. Pat. No. 4,292,226). Oxazolidines, for example those used in U.S. Pat. No. 4,192,937, are also capped polyamines which can be used for producing the polyurethanes of the invention, for purposes of chain-extension of the prepolymers. When capped polyamines of this type are used, they are generally mixed with the prepolymers in the absence of water, and this mixture is then mixed with the dispersion water or with a portion of the dispersion water, so that the corresponding polyamines are liberated by hydrolysis.

It is preferable to use mixtures of di- and triamines, and it is particularly preferable to use mixtures of isophoronediamine (IPDA) and diethylenetriamine (DETA).

The polyurethanes preferably comprise, as monomers (d), from 1 to 30 mol %, particularly from 4 to 25 mol %, based on the total amount of functional groups of monomers reactive towards isocyanates, of a polyamine having at least 2 amino groups reactive toward isocyanates. It is also possible to use, as monomers (d) for the same purpose, isocyanates of functionality higher than two. Examples of compounds available commercially are the isocyanurate or the biuret of hexamethylene diisocyanate.

Monomers (e) which are optionally used concomitantly are monoisocyanates, monoalcohols, and monoprimary and -secondary amines. The proportion of these is generally at most 10 mol %, based on the total molar amount of the monomers. Said monofunctional compounds usually bear other functional groups, examples being olefinic groups or carbonyl groups, and are used to introduce functional groups into the polyurethane, where these permit the dispersion and, respectively, the crosslinking or further polymer-analogous reaction of the polyurethane. Monomers that can be used for this purpose are those such as isopropenyl-α,α-dimethylbenzyl isocyanate (TMI) and esters of acrylic or methacrylic acid, e.g. hydroxyethyl acrylate or hydroxyethyl methacrylate.

Preferably, the polyurethane consists to at least 50% by weight, more preferably to at least 80% by weight, or to at least 90% by weight of, based on the sum of all monomers, of diisocyanates (a), diols (b) and bifunctional carboxylic acids (c).

The total amount of monomers (d) and (e) is preferably up to or less than 10% by weight, for example 0.1 to 10% by weight or 0.5 to 5% by weight.

Adhesive with particularly good property profile are especially obtained if monomers (a) used are in essence only aliphatic diisocyanates, cycloaliphatic diisocyanates, or araliphatic diisocyanates. In an excellent method, said monomer combination is complemented by, as component (c), alkali-metal salts of dihydroxy- or diaminomonocarboxylic acid; the Na salt is most suitable here.

Most preferred are components (a) to (e) which result in a polyurethane with a glass transition temperature of less than 20° C. and either no melting point above 20° C. or wherein the polyurethane has a melting point above 20° C. with an enthalpy of fusion lower than 10 J/g.

The method for adjusting the molecular weight of the polyurethanes via selection of the proportions of the mutually reactive monomers, and also of the arithmetic average number of reactive functional groups per molecule, is well known in the polyurethane chemistry sector. The normal method selects components (a) to (e), and also the respective molar amounts of these, in such a way that the ratio A:B, where A is the molar amount of isocyanate groups and
B is the sum of the molar amount of the hydroxy groups and of the molar amount of the functional groups which can react with isocyanates in an addition reaction,
is from 0.5:1 to 2:1, preferably from 0.8:1 to 1.5, particularly preferably from 0.9:1 to 1.2:1. The ratio A:B is very particularly preferably as close as possible to 1:1.

The monomers (a) to (e) used usually bear an average of from 1.5 to 2.5, preferably from 1.9 to 2.1, particularly preferably 2.0, isocyanate groups and, respectively, functional groups which can react with isocyanates in an addition reaction.

The polyaddition reaction of the structural components used to produce the polyurethane preferably takes place at reaction temperatures of up to 180° C., with preference up to 150° C., at atmospheric pressure or at autogenous pressure. The production of polyurethanes and, respectively, of aqueous polyurethane dispersions is known to the person skilled in the art. The polyurethanes preferably take the form of aqueous dispersion and are used in this form. The pH of the polymer dispersion is preferably adjusted to pH above 5, in particular to pH from 5.5 b 10.5.

The adhesive to be used in the invention comprises carboxylate groups and preferably other reactive groups, where these can enter into a crosslinking reaction with one another or with external crosslinking agents. The amount of said reactive groups preferably present is from 0.0001 to 0.5 mol/100 g of adhesive, particularly from 0.0005 to 0.5 mol/100 g of adhesive. Carboxy groups are also formed via hydrolysis reactions, and it is therefore also possible that crosslinking can occur without any initial content of carboxy groups in the polyurethane.

In one embodiment of the invention, the polyurethane dispersion adhesive comprises at least one external crosslinking agent. Examples of suitable crosslinking agents are polyisocyanates having at least two isocyanate groups, e.g. isocyanurates formed from diisocyanates, compounds having at least one carbodiimide group, chemically capped isocyanates, encapsulated isocyanates, encapsulated uretdiones, biurets, or allophanates. Aziridines, oxazolines, and epoxides are also suitable. The amount used of the external crosslinking agent is preferably from 0.5 to 10% by weight, based on the solids content of the dispersion. An external crosslinking agent is a compound which, prior to the crosslinking reaction, has not been bonded to the polyurethane but instead has been dispersed or dissolved in the polyurethane dispersion. However, it is also possible to use crosslinking agents which have been bonded to the polyurethane (internal crosslinking agents).

In the invention, the polyurethane dispersions of the invention are used in aqueous adhesive preparations for producing laminates, i.e. in aqueous lamination-adhesive preparations for the adhesive bonding of large-surface-area substrates; they are used in particular for producing composite foils.

The present invention therefore also provides a process for producing composite foils which are biodisintegratable at home compost conditions (25±5° C.) by using an aqueous adhesive preparation which comprises at least one polymer dispersion of the invention as described herein.

The process comprises providing an aqueous polyurethane dispersion adhesive with the polyurethane-based features as descried above, and adhesive-bonding at least two substrates to one another with use of the aqueous polyurethane dispersion adhesive, wherein at least one of the substrates is a foil which is biodisintegratable at home compost conditions; and wherein the polyurethane has a glass transition temperature below 20° C., characterized in that the polyurethane either has no melting point above 20° C. or wherein the polyurethane has a melting point above 20° C. with an enthalpy of fusion lower than 10 J/g; wherein a film of the polyurethane adhesive decomposes at home compost conditions to more than 90% by weight into $CO_2$ and water within 360 days.

The invention also provides a home compostable composite foil produced according to the process as described herein. The invention also provides flexible packaging made at least in part of said home compostable composite foil.

The aqueous polymer dispersions here can be used without further additives or after further processing with conventional auxiliaries. Examples of conventional auxiliaries are wetting agents, thickeners, protective colloids, light stabilizers, biocides, antifoams, etc. The adhesive preparations of the invention do not require the addition of plasticizing resins (tackifiers) or of other plasticizers.

In the process for producing composite foils, at least two substrates are adhesive-bonded to one another with use of the aqueous polymer dispersion. The substrates are large-surface-area, flexible components, of which at least one is, and preferably both are, polymer foil(s) or wherein a first substrate is a polymer foil and a second substrate is paper.

In the process of the invention for producing composite foils, the polymer dispersion of the invention or a corresponding further-processed preparation is applied preferably using a layer thickness of from 0.1 to 20 g/m², particularly preferably from 1 to 7 g/m², to the substrates that are to be adhesive-bonding, for example via doctoring, spreading, etc. Conventional coating processes can be used, e.g. roller coating, reverse-roll coating, gravure-roll coating, reverse-gravure-roll coating, brush coating, bar coating, spray coating, airbrush coating, meniscus coating, curtain coating, or dip coating. After a short time for air-drying of the dispersion water (preferably after from 1 to 60 seconds), the coated substrate can then be laminated to a second substrate, and the temperature here can by way of example be from 20 to 200° C., preferably from 20 to 100° C., and the pressure here can by way of example be from 100 to 3000 kN/m², preferably from 300 to 2000 kN/m².

In one embodiment, the polymer dispersion of the invention is used as single-component composition, i.e. without additional crosslinking means, in particular without isocyanate crosslinking agent. However, the polymer dispersion of the invention can also be used as two-component adhesive, where a crosslinking component, e.g. a water-emulsifiable isocyanate, is added shortly before application of the adhesive. A two-component composition is a product consisting of two separately packaged compositions which are mixed shortly before its use. At least one of the substrates can have been metalized or printed on the side coated with the adhesive. At least one of the substrates, preferably both substrates, is/are biodisintegratable under home composting conditions, and preferably home compostable.

It can be advantageous to apply the home compostable polymer (the first substrate) to the second substrate by extrusion coating process. The abovementioned aqueous lamination adhesive preparation (polymer dispersion) is applied as intermediate layer. The advantage in the use of the lamination adhesive preparation in the extrusion coating process derives from the possibility of lowering the extrusion temperature. The mild conditions used save energy and guard against any decomposition of the home compostable polymer.

Examples of suitable substrates are foils made of lignin, of starch, of cellulose materials, of polylactic acid (PLA), of polylactic acid stereocomplexes (PLLA-PDLA), of polyglycolic acid (PGA), of aliphatic polyesters, of aliphatic-aromatic copolyesters, and of polyhydroxyalkanoates, cellophane, polypropylene carbonate (PPC), and mixtures of the abovementioned materials. Examples of aliphatic polyesters are polybutylene succinate (PBS), polybutylene succinate-co-butylene adipate (PBSA), polybutylene succinate-co-butylene sebacate (PBSSe), polycaprolactone (PCL), and polypentadecanolide. Examples of aliphatic-aromatic copolyesters are polybutylene adipate-co-butyleneterephthalate (PBAT), polybutylene sebacate-co-butylene terephthalate (PBSeT), polybutylene azelate-co-butylene terephthalate (PBAzeT), polybutylene brassylate-co-butylene terephthalate (PBBrasT). Examples of particularly suitable materials are Ecoflex® foils, e.g. Ecoflex® F or Ecoflex® FS. Examples of polyhydroxyalkanoates are poly-3-hydroxybutyrate (PHB), poly-3-hydroxybutyrate-co-3-hydroxyvalerate (P(3HB)-co-P(3HV)), poly-3-hydroxybutyrate-co-4-hydroxybutyrate (P(3HB)-co-P(4HB)), poly-3-hydroxybutyrate-co-3-hydroxyhexanoate (P(3HB)-co-P(3HH)).

Particularly suitable are cellophane-based foils (e.g. Natureflex® foils) or mixtures of aliphatic-aromatic copolyesters with PLA (e.g. Ecovio® foils) or mixtures of aliphatic polyesters, aliphatic-aromatic copolyesters, or polyvinyl alcohol with starch (e.g. Mater-Bi® foils).

The foils can also be metal-coated, e.g. aluminum-coated (metalized) polymer foils (abbreviated to: metalized foils). The abovementioned foils can by way of example have been printed with printing inks. The material of the first substrate is preferably selected from lignin, starch, cellulose materials, polylactic acid, polyglycolic acid, aliphatic polyesters, aliphatic-aromatic copolyesters, polyhydroxyalkanoates, polypropylene carbonate, and mixtures of the abovementioned materials, and the material of the second substrate is preferably selected from paper, lignin, starch, cellulose materials, polylactic acid, polyglycolic acid, aliphatic polyesters, aliphatic-aromatic copolyesters, polyhydroxyalkanoates, polypropylene carbonate, and mixtures of the abovementioned materials.

In one embodiment of the invention, the first foil and/or the second foil has been metalized or printed on the respective side which is coated with the polymer dispersion of the invention. The thickness of the substrate films can by way of example be from 5 to 100 µm, preferably from 5 to 40 µm.

Particular preference is given to composite foils where the material of the second substrate is paper and the material of the first substrate is a home compostable polymer foils such as mixtures of aliphatic-aromatic copolyesters with PLA (Ecovio®) foils) or cellophane-based foils (e.g. Natureflex® foils)

These composite foils can, as mentioned above, be produced via lamination processes or extrusion processes. WO 2010/034712 describes an advantageous extrusion process for paper coating, and biodisintegratable polymers preferred for this purpose, and said document is expressly incorporated herein by way of reference. The extrusion process in WO 2010/034712 is supplemented by the lamination adhesive layer of the invention between first and second substrate.

Dispersion coatings require no heating prior to application. The application technology is comparable with that for hot-melt adhesives, if sheet-like coatings are involved. The web speeds are very high: up to 3000 m/min. Dispersion coating processes can therefore also be carried out on line on papermaking machines.

In the case of thin layers, it is also possible to apply the biodisintegratable polymer in the form of hotmelt, to a certain extent in the form of a special case of the extrusion coating process or of the dispersion application process. Said process is described in Ullmann, TSE Troller Coating. The hotmelt adhesive (hotmelt) is pumped from a feed vessel preheated to about 150 to 200° C. into the nozzle through which the material is applied to the surface.

The extrusion coating process was developed in order to apply thin polymer layers to flexible substrates, such as paper, paperboard, or multilayer foils with metal layer, with high web speeds of from 100 to 600 m/min. The biodisintegratable polymers can be processed on existing extrusion-coating systems for polyethylene (J. Nentwig: Kunststoff-folien [Plastics foils], Hanser Verlag, Munich 2006, p. 195; H. J. Saechtling: Kunststoff Taschenbuch [Plastics handbook], Hanser Verlag, Munich 2007, p. 256; C. Rauwendaal: Polymer Extrusion, Hanser Verlag, Munich 2004, p. 547).

"Paper products" can be used as second substrate. For the purposes of the present invention, the term "paper products" covers all types of paper and in particular paperboard.

Suitable fibers for producing said paper products are any of types customarily used, e.g. mechanical pulp, bleached and unbleached chemical pulp, paper stocks from any of the annual plants and wastepaper (including that in the form of broke, either coated or uncoated). Said fibers can be used either alone or in the form of any desired mixture of these to produce the pulps from which the paper products are produced. The term mechanical pulp covers, for example, groundwood, thermomechanical pulp (TMP), chemothermomechanical pulp (CTMP), pressure groundwood, semi-chemical pulp, high-yield chemical pulp, and refiner mechanical pulp (RMP). By way of example, sulfate pulps, sulfite pulps, and soda pulps are suitable chemical pulps. Examples of suitable annual plants for producing paper stocks are rice, wheat, sugarcane, and kenaf.

Amounts of from 0.01 to 3% by weight, preferably from 0.05 to 1% by weight, of size, in each case in terms of solids, based on dry paper substance, are usually added to the chemical pulps, and these vary with the desired degree of sizing of the papers to be finished. The paper can moreover comprise other substances, e.g. starch, pigments, dyes, optical brighteners, biocides, paper strength agents, fixing agents, antifoams, retention aids, and/or drainage aids.

The kraft liners (composite foils) produced preferably have the following structure:
i) paper of grammage from 30 to 600 g/m², preferably from 40 to 400 g/m², and with particular preference from 50 to 150 g/m²,
ii) a biodisintegratable polymer layer of thickness from 1 to 100 µm, preferably from 5 to 80 µm, and with particular preference from 10 to 60 µm.

A very wide variety of materials can be used for the paper layers, e.g. white or brown kraft liner, pulp, wastepaper, corrugated material, or screenings.

The total thickness of the paper-foil composite is generally from 31 to 1000 g/m². Lamination can preferably be used to produce a 80-500 µm paper-foil composite, and extrusion coating can particularly preferably be used to produce a 50-300 µm paper-foil composite.

It is not essential to surface-coat the foil substrates prior to the coating with a polymer dispersion of the invention. However, better results can be obtained if the surface of the foil substrates is modified prior to the coating process. Conventional surface treatments can be used here, examples being corona treatment, to reinforce the adhesive effect. The corona treatment or other surface treatments are carried out to the extent required for sufficient wettability with the coating composition. A corona treatment using about 10 watts per square meter and minute is usually sufficient for said purpose. As an alternative or in addition it is also optionally possible to use primer or intermediate layers between foil substrate and adhesive coating. The composite foils can also have other, additional functional layers, e.g. barrier layers, print layers, color layers or lacquer layers, or protective layers. The location of the functional layers here can be external, i.e. on that side of the foil substrate that faces away from the adhesive-coated side, or internal, between foil substrate and adhesive layer.

Within the composite foil of the invention, the second substrate (e.g. paper) has protection from mineral oil and other types of oil, and from fat, and moisture, because the first substrate (e.g. biodisintegratable polymer foil) exerts an appropriate barrier effect. On the other hand, when the composite foils are used for food packaging, the foods have protection from the mineral oils and mineral substances present by way of example in the wastepaper since the first substrate (e.g. biodisintegratable polymer foil) exerts said barrier effect. Because moreover the composite foil can be welded to itself and also to paper, paperboard, and metal, it permits production of, for example, coffee cups, drinks cartons, or cartons for frozen products.

The composite foil is particularly suitable for producing paper bags for dry foods, e.g. coffee, tea, soup powder, sauce powder; for liquids, e.g. cosmetics, cleaning compositions, drinks; tubular laminates; paper carrier bags, paper laminates and coextrudates for ice-cream, confectionery (e.g. chocolate bars and muesli bars) and paper adhesive tape; paper cups, yoghurt pots; ready-meal trays; wound paperboard containers (cans, drums), wet-strength cartons for outer packaging (wine bottles, food); fruit boxes made of coated paperboard; fast-food plates; clamp shells; drinks cartons and cartons for liquids, such as detergents and cleaning compositions, cartons for frozen products, ice packaging (e.g. ice cups, wrapping material for conical ice-cream wafers); paper labels; flowerpots and plant pots.

The composite foils produced in the invention are particularly suitable for producing flexible packaging, in particular for food packaging.

Therefore, the invention provides the use of the aqueous polyurethane dispersion adhesive as described herein for producing composite foils which are biodisintegratable at home compost conditions and wherein the composite foil is a part of a home compostable flexible packaging.

An advantage of the invention is that the polyurethane adhesive dispersions used in the invention can provide good adhesive bonding of various substrates to one another, giving the adhesive-bonded composite high strength. The composite foils produced in the invention moreover feature good biodegradability and home compostability.

EXAMPLES

Glass transition temperatures are determined by Differential Scanning Calorimetrie (ASTM D 3418-08, "midpoint temperature" of second heating curve, heating rate 20 K/min).

Melting-points and enthalpy of fusion are determined according to DIN 53765 (1994) (melting point=peak temperature) by heating with 20 K/min after heating the polyurethane films to 120° C., cooling with 20 K/min to 23° C., annealing there for 20 hours.

Example 1

551 g of a polyesterdiol made of adipic acid, 1,6-hexanediol and neopentyl glycol (molar ratio of 1,6-hexanediol: neopentyl glycol=1.8:1; OH number=56 mg KOH/g) and 20.1 g dimethylolpropionic acid (DMPA) are reacted at 70-75° C. in 169 g water-free acetone with 96.19 g hexamethylene diisocyanate to a NCO-content of 1.4%. The mixture is then diluted with 735 g of acetone and cooled to 35-38° C. The mixture is neutralized with 125.4 g of a 5% strength of aqueous sodium hydroxide solution and the mixture is dispersed using 1201 g of deionized water. A solution of 9.08 g diethylenetriamine (DETA) in 110 g deionized water is added dropwise in 10 min. The mixture is diluted with 127 g water and the acetone is removed by distillation in vacuo, and solids content is adjusted to 30%.

Analysis values: LD: 97; pH: 8.9; Tg: −42° C.
amorphous, no melting point detectable Example 2

722.6 g of a polyesterdiol made of adipic acid, 1,6 hexanediol and neopentyl glycol (molar ratio of 1,6-hexanediol:neopentyl glycol=1.8:1; OH number=56 mg KOH/g) and 20.1 g dimethylolpropionic acid (DMPA) are reacted at 80° C. in 120 g water-free acetone with 96.8 g hexamethylene diisocyanate to a NCO-content of 0.85%. The mixture is then diluted with 906 g of acetone and cooled to 50° C. 16.35 g of isophoronediamine (IPDA) are added dropwise in 5 min and the mixture is stirred for 30 min. The mixture is neutralized with 40.3 g of a 5% strength of aqueous sodium hydroxide solution and the mixture is dispersed using 814 g of deionized water. The acetone is removed by distillation in vacuo, and solids content is adjusted to 50%.

Analysis values: LD: 71; pH: 7.5; TG: −45° C.
amorphous, no melting point detectable Example 3

602 g of a polyesterdiol made of adipic acid, 1,6 hexanediol and neopentyl glycol (OH number=56 mg KOH/g), 0.1 g Borchikat 315 (Borchers, catalyst) and 13.4 g dimethylolpropionic acid (DMPA) are reacted at in 150 g water-free acetone at 70° C. with 80.7 g hexamethylene diisocyanate to a NCO-content of 0.79%. The mixture is then diluted with 705 g acetone and cooled to 50° C. 13.6 g IPDA are added dropwise in 5 min and the mixture is stirred for 30 min. The mixture is neutralized with 50.4 g of a 5% strength of aqueous sodium hydroxide solution and the mixture is dispersed using 937 g of deionized water. The acetone is removed by distillation in vacuo, and solids content is adjusted to 42%.

Analysis values: LD: 91; pH: 7.6;
Tg −45° C.; no melting point detected

Example 4

602 g of a polyesterdiol made of adipic acid, 1,6 hexanediol and neopentyl glycol (OH number=56 mg KOH/g) and 13.4 g dimethylolpropionic acid (DMPA) are reacted at 90° C. in 62 g water-free acetone with 80.7 g hexamethylene diisocyanate to a NCO-content of 0.88%. The mixture is then diluted with 793 g of acetone and cooled to 50° C. 13.6 g of isophoronediamine (IPDA) are added dropwise in 5 min and the mixture is stirred for 30 min. The mixture is neutralized with 26.9 g of a 6% strength of aqueous ammonia solution and the mixture is dispersed using 686 g of deionized water. The acetone is removed by distillation in vacuo, and solids content is adjusted to 50%.

Analysis values: LD: 63; pH: 7.8
Tg −43 C; melting point+45° C. (not reproducible); <2 J/g enthalpy of fusion Example 5

602 g of a polyesterdiol made of adipic acid, 1,6 hexanediol and neopentyl glycol (OH number=56 mg KOH/g) and 9.4 g dimethylolpropionic acid (DMPA) are reacted at 65° C. in 212 g water-free acetone with 62.2 g hexamethylene diisocyanate to a NCO-content of <0.1%. The mixture is then diluted with 638 g of acetone and cooled to 50° C. The mixture is neutralized with 25 g of a 7% strength of aqueous ammonia solution and the mixture is dispersed using 653 g of deionized water. The acetone is removed by distillation in vacuo, and solids content is adjusted to 48%.

Analysis values: LD: 86; pH: 8
Tg −46° C.; no melting point detected

Example 6 (Comparative)

Example 1 of WO 2012/013506 A1
melting point: 52° C.; enthalpy of fusion: 60 J/g Tg: −51° C.

Example 7

604 g of a polyesterdiol made of adipic acid, 1,6-hexanediol and neopentyl glycol (OH number=56 mg KOH/g), 0.94 g trimethylolpropane and 9.39 g dimethylolpropionic acid (DMPA) are reacted at 90° C. in 70 g water-free acetone with 70.9 g hexamethylene diisocyanate for 3 hours 30 min. Then 180 g of water-free acetone is added over 7 hours and the temperature reduced to 65° C. The reaction is continued to a NCO-content of 0.4%. The mixture is then diluted with 450 g of acetone and cooled to 57° C. The mixture is neutralized with 26.4 g of a 10% strength of aqueous sodium hydroxide solution and the mixture is dispersed using 664 g of deionized water. The acetone is removed by distillation in vacuo, and solids content is adjusted to 50%.

Analysis values: LD: 74; pH: 8.0
amorphous, no melting point; Tg: −52° C.

Example 8

604 g of a polyesterdiol made of adipic acid, 1,6-hexanediol and neopentyl glycol (OH number=56 mg KOH/g), 1.34 g trimethylolpropane and 13.4 g dimethylolpropionic acid (DMPA) are reacted at 75° C. in 150 g water-free acetone with 83.2 g hexamethylene diisocyanate to a NCO-content of 0.79%. The mixture is then diluted with 880 g of acetone and cooled to 55° C. 13.6 g of isophoronediamine (IPDA) are added dropwise in 3 min and the mixture is stirred for 30 min. The mixture is neutralized with 38 g of a 5% strength of aqueous sodium hydroxide solution and the mixture is dispersed using 844 g of deionized water. The acetone is removed by distillation in vacuo, and solids content is adjusted to 47%.

Analysis values: LD: 73; pH: 7.7
amorphous, no melting point; Tg: −52° C.

Example 9

608.7 g of a polyesterdiol made of adipic acid, ethylene-glycol and diethylene-glycol (OH number=56 mg KOH/g) and 13.4 g dimethylolpropionic acid (DMPA) are reacted at 94° C. in 62 g water-free acetone with 70.6 g hexamethylene diisocyanate for 4 hours. Then 130 g of water-free acetone is added over 3 h and the temperature reduced to 67° C. The reaction is continued to a NCO-content of 0.19%. The mixture is then diluted with 646 g of acetone and cooled to 57° C. 3.4 g of isophoronediamine (IPDA) diluted in 13.6 g acetone are added dropwise in 5 min and the mixture is stirred for 30 min. The mixture is neutralized with 23.8 g of a 5% strength of aqueous ammonia solution and the mixture is dispersed using 795 g of deionized water. The acetone is removed by distillation in vacuo, and solids content is adjusted to 49%.

Analysis values: LD: 52; pH: 7.2
amorphous, no melting point; Tg: −40° C.

Example 10

725 g of a polyesterdiol made of adipic acid, 1,6 hexanediol and neopentyl glycol (OH number=56 mg KOH/g) and 11.3 g dimethylolpropionic acid (DMPA) are reacted at 70° C. in 120 g water-free acetone with 82.7 g hexamethylene diisocyanate to a NCO-content of 0.45%. The mixture is then diluted with 600 g of acetone and cooled to 57° C. The mixture is neutralized with 31.7 g of a 10% strength of aqueous sodium hydroxide solution and the mixture is dispersed using 794 g of deionized water. The acetone is removed by distillation in vacuo, and solids content is adjusted to 50%.

Analysis values: LD: 56; pH: 8.2
melting point 20° C. (weak); Tg −53° C.; heat of fusion <2 J/g

Example 11 (Comparative)

Polyurethane dispersion made according to example 1 of WO 2006/087348 A1 (EP 1853640).

Example 12

604 g of a polyesterdiol made of adipic acid, 1,6-hexanediol and neopentyl glycol (OH number=56 mg KOH/g), 0.64 g Glycerol and 9.39 g dimethylolpropionic acid (DMPA) are reacted at 90° C. in 70 g water-free acetone with 70.9 g hexamethylene diisocyanate for 3 hours 30 min. Then 180 g of water-free acetone is added over 7 hours and the temperature reduced to 65° C. The reaction is continued to a NCO-content of 0.4%. The mixture is then diluted with 580 g of acetone and cooled to 57° C. The mixture is neutralized with 26.4 g of a 10% strength of aqueous sodium hydroxide solution and the mixture is dispersed using 664 g of deionized water. The acetone is removed by distillation in vacuo, and solids content is adjusted to 50%.

Analysis values: LD: 77.4; pH: 8.7
amorphous, no melting point; Tg: −52° C.

Composting Test

Home compostability is tested according to Australian Standard AS 5810-2010 and ISO 14855-1 (2012) "Determination of the ultimate aerobic biodegradability of plastic materials under controlled composting conditions—Method by analysis of evolved carbon dioxide" at ambient temperature (28±2° C.) to simulate home composting conditions instead of the described temperature of 58° C.

The results are summarized in table 1.

TABLE 1

Results of home compostability tests

| | Days for 90% biological degradation at 28° C. | Days after which no residues are visibly detectable |
|---|---|---|
| Example 1 | 90 | 110 |
| Example 6 (comparative) | >360 | >360 |

Based on these results, similar home compostability as for example 1 is expected for examples 2 to 5.

Besides home compostability, the examples 1 to 5 generate a high bonding strength in the laminates. This has been demonstrated in laminates consisting of two Ecovio® Films (mixtures of aliphatic-aromatic copolyesters with polylactic acid; certified compostable).

Preparation of Film-to-Film Laminates:

The examples are knife-coated in a dry film thickness of 3 μm onto a first Ecovio®-film with thickness of 35 μm. The coated films are dried in a hot air stream and dry laminated to a second Ecovio®-film under a pressure of 6.5 bar and at 70° C. in a roller press at 5 m/min. The composite films are subsequently stored for 1 day at room temperature under standard conditions (23° C.; 50% relative humidity).

Measurement of Peel Strength:

Following storage of the laminate for 24 h at room temperature the laminate is cut into strips 15 millimeters wide. The laminate strip is pulled apart on a Zwick tensile testing machine and the force required to achieve this is recorded. The test takes place on a tensile testing machine at an angle of 90 degrees (T-test) and a removal velocity of 100 mm/min. The test strip is opened up on one side, with one of the resultant ends being clamped into the upper jaw and the other into the lower jaw of the tensile testing machine, and the test is commenced. The result reported is the average maximum of the force from 3 individual measurements, in N/15 mm.

The results are shown in table 2.

TABLE 2

Results of bonding strength tests

| | Peel strength [N/15 mm] |
|---|---|
| Example 1 | 1.4 |
| Example 2 | 2.0 |
| Example 3 | 2.6 |
| Example 4 | 4.4 |
| Example 5 | 2.3 |
| Example 6 (comparative) | 1.5 |
| Example 7 | 1.7 |
| Example 8 | 1.3 |
| Example 9 | 1.2 |
| Example 10 | 1.9 |
| Example 12 | 1.2 |
| Target value | >1 |

Enzyme-Based Test for Biodegradability

For evaluating potential biodegradability, an enzyme-based quick-test was applied according to Tokiwa's method (Nature 270, 76, 1977) to simulate home-compostability. Enzymes are able to hydrolyze ester-bonds in polymers, the resulting carboxylic acids cause a drop in pH, visible with the help of a pH-indicator and a photometer.

If a comparison is made of the test results of degradation, caused by enzymes of polyurethane dispersion adhesives with the home compost test results under home compost conditions of these polyurethane dispersion adhesives (see example 1), a good correlation is found between the ability to degrade with enzymes and the ability to degrade under home compost conditions. Comparative control probes, such as polyurethane dispersion adhesives which will not degrade at all (example 11; polyetherol-based polyurethane), do not show any sign of enzyme degradation, while polyurethane dispersion adhesives that only are compostable under industrial conditions (example 6), will show only slow degradation with enzymes in this test.

Reagents and Substances Used:
Buffer:
    20 mM phosphate-buffer, pH 7.0
    Stock solution: 13.6 g potassium dihydrogenphosphate $KH_2PO_4$ (Sigma; P9791) is dissolved in 800 ml deionized water. The pH is adjusted by adding NaOH to pH 7. The solution is completed by filling to 1000 ml with deionized water
Enzymes:
    *Rhizopus oryzae* Lipase (Sigma; 62305)
    *Pseudomonas fluorescens* Esterase (Sigma; 75742)
    *Pseudomonas cepacia* Lipase (Sigma; 62309)
    *Pseudomonas* sp. Cholesterol Esterase (Creative Enzymes; DIA-134)
    *Pseudomonas* sp. Lipoprotein Lipase (Creative Enzymes; DIA-210)
    All Enzymes are dissolved in 20 mM phosphate-buffer (pH 7.0) and stabilized with 50% (v/v) glycerole for storage at −20° C. A stock-solution with 100 U/ml of each enzyme is prepared.
pH Indicator:
    pH indicator is bromothymol blue (Sigma; B8630). A stock solution is prepared by dissolving 200 mg bromothymol blue in 100 ml potassium phosphate-buffer (5 mM, pH7.0).
Control:
    Polycaprolactone powder (PCL; Sigma; 440744) is used as a control substrate.

Test Vessels:
    A 96-Microwell plate (Sigma; TMO267556) is used as test vessels.
Photometer:
    The test assays are analyzed by a photometer (Microwell-Reader; Tecan Infinite M1000 Pro).
Test Procedure:
    For one substrate, the following substances are prepared:
    3× test substance à 200 µl:
    0.5% (w/v) test substance
    20 mM phosphate-buffer (pH 7.0)
    0.2 mg/ml bromothymol blue
    5 U/ml for each enzyme
    1× test blind à 200 µl:
    0.5% (w/v) test substance
    20 mM phosphate-buffer (pH 7.0)
    0.2 mg/ml bromothymol blue
    3× control à 200 µl:
    0.5% (w/v) polycaprolacton
    20 mM phosphate-buffer (pH 7.0)
    0.2 mg/ml bromothymol blue
    5 U/ml for each enzyme
    1× control blind à 200 µl:
    0.5% (w/v) polycaprolacton
    20 mM Phosphate-buffer (pH 7.0)
    0.2 mg/ml bromothymol blue
    1× enzyme blind à 200 µl:
    20 mM phosphate-buffer (pH 7.0)
    0.2 mg/ml bromothymol blue
    5 U/ml for each enzyme
    1× buffer blind a 200 µl:
    20 mM phosphate-buffer (pH 7.0)
    0.2 mg/ml bromothymol blue The substrates to be tested are prepared as 5% (w/v) solutions in DMSO. Buffer, pH indicator and enzymes are mixed in their final concentrations and preheated to 37° C. Amounts of 20 µl stock solution of test substance (or control substance) are precharged per well and 180 µl of reaction mixture are added to start the reaction and placed into the reader. The microwell plate is heated to 37° C. while shaking. The measurement is continued over several hours. The absorptions at 433 nm and at 615 nm are recorded every 5 min. Both wavelengths are the maxima of absorption of bromothymol blue at different states of protonation, depending on pH.

Test results can be documented by photographs or in a chart depending on time. The absorption quotient of the absorptions at 433 nm and at 615 nm is used as signal readout. In a mixture of 20 mM phosphate buffer (pH 7.0) and 0.2 mg/ml bromothymol blue the absorption quotient 433 nm/615 nm has the value 0.5. The higher the quotient, the lower the pH. The higher the pH change compared to the control-substance, the higher the enzymatic degradation of the test substance.

Figure 2:
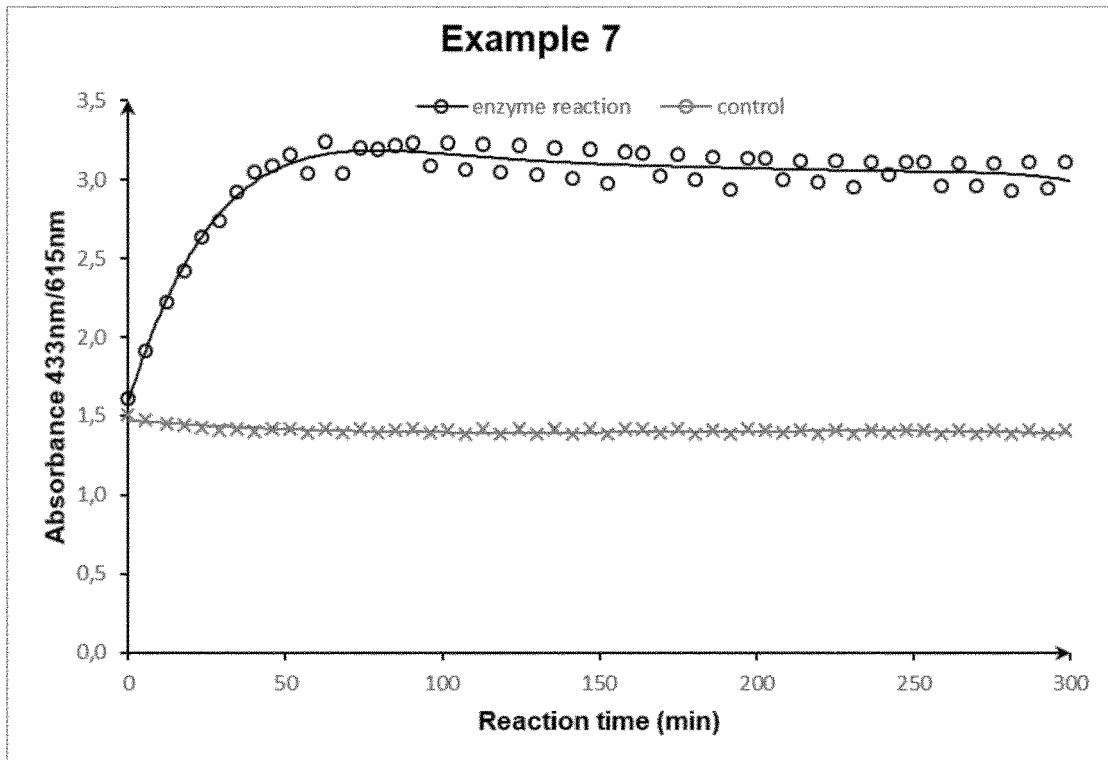
Figure 3:
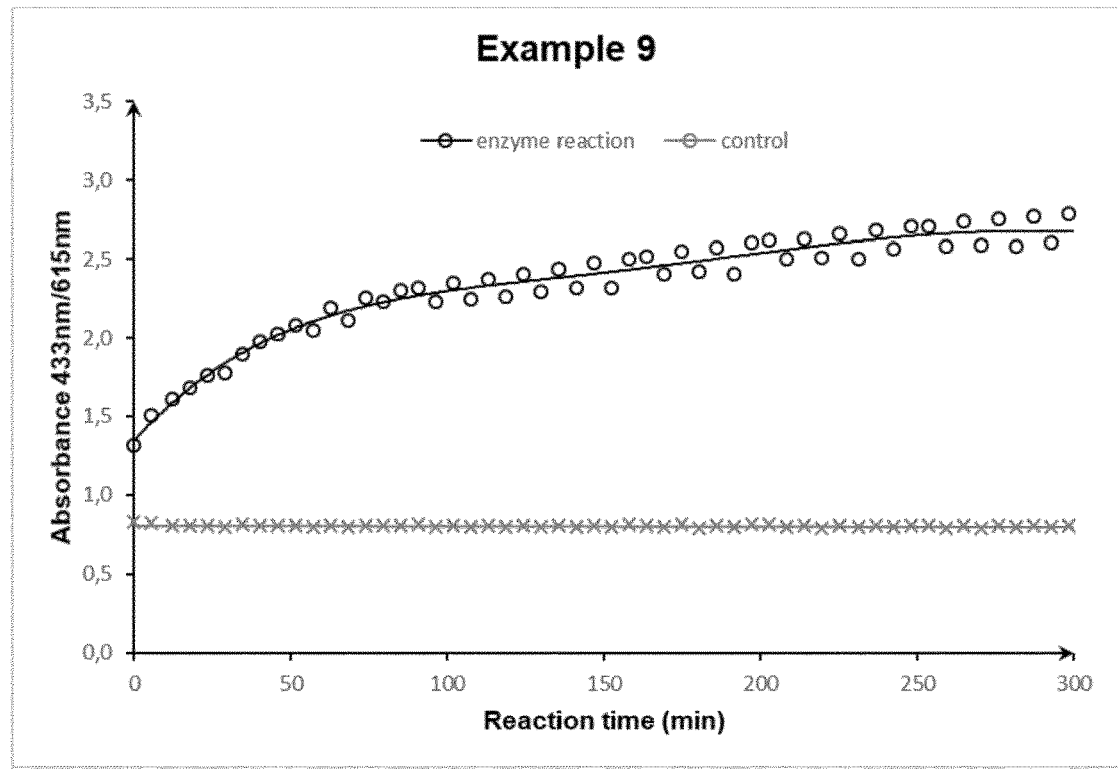
Figure 4:
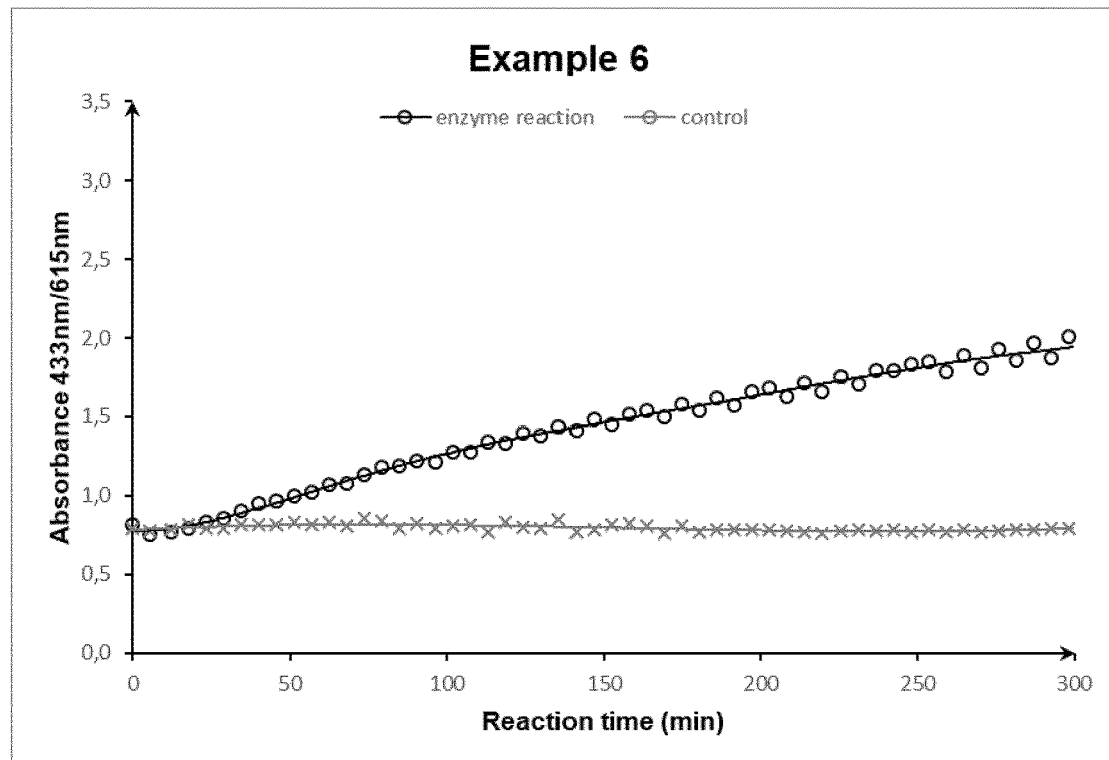
Figure 5:
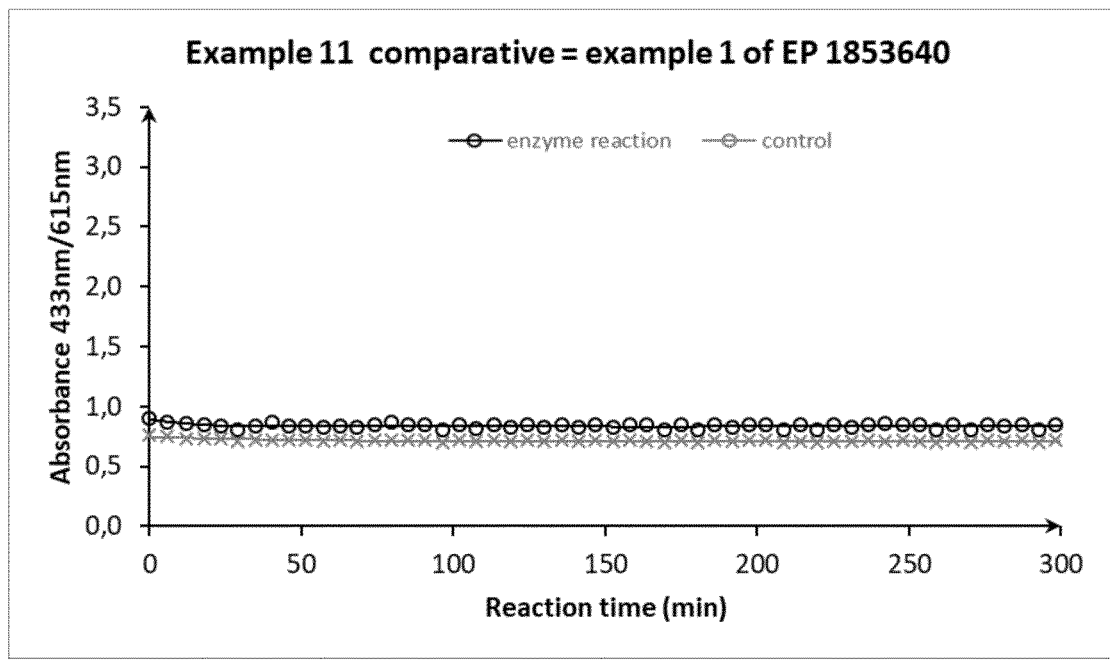

The results of the enzyme degradation tests are shown in FIGS. 1 to 5. Home-compostable materials (examples 1, 7 and 9; FIGS. 1, 2 and 3, respectively) show a steep increase in the 433 nm/615 nm absorbance ratio (quick enzymatic degradation) within the first 50 minutes and reach a plateau (full enzymatic degradation, based on the enzymes used) within 300 minutes. Non-home compostable materials (examples 6 and 11; FIGS. 4 and 5, respectively) either show no increase or only a low increase in the 433 nm/615 nm absorbance ratio (no or slow enzymatic degradation) within the first 50 minutes and do not reach a plateau (no full enzymatic degradation based on the enzymes used) within 300 minutes.

FIG. 1:

FIG. 1 shows the development of the 433 nm/615 nm absorbance ratio over time for polyurethane of example 1. The 433 nm/615 nm absorbance ratio shows a steep increase, reaching a plateau within 50 minutes. This is a good correlation with the composting test results described above.

FIG. 2:

FIG. 2 shows the development of the 433 nm/615 nm absorbance ratio over time for polyurethane of example 7. The 433 nm/615 nm absorbance ratio shows a steep increase, reaching a plateau in less than 100 minutes.

FIG. 3:

FIG. 3 shows the development of the 433 nm/615 nm absorbance ratio over time for polyurethane of example 9. The 433 nm/615 nm absorbance ratio shows a steep increase at the beginning, reaching a plateau in less than 300 minutes.

FIG. 4:

FIG. 4 shows the development of the 433 nm/615 nm absorbance ratio over time for polyurethane of example 6 (comparative example; example 1 of WO 2012/013506 A1). The 433 nm/615 nm absorbance ratio shows a shallow increase, not reaching a plateau within 300 minutes. This is a good correlation with the composting test results described above. This example is industrial compostable (compostable at the elevated temperatures of industrial compost facilities) but significantly less home-compostable at the lower temperatures of home-compost conditions.

FIG. 5:

FIG. 5 shows the development of the 433 nm/615 nm absorbance ratio over time for polyurethane of example 11 (comparative example; example 1 of WO 2006/087348 A1). There is no increase of the 433 nm/615 nm absorbance ratio and therefore no enzymatic degradation under the test conditions.

The invention claimed is:

1. A method providing an aqueous polyurethane dispersion adhesive for producing composite foils which are biodisintegratable at home compost conditions (25±5° C.), where at least one first substrate is adhesive-bonded to at least one second substrate with use of the polyurethane dispersion adhesive, wherein at least one of the substrates is a polymer foil which is biodisintegratable at home compost conditions, and where more than 80% by weight of the polyurethane is composed of
(a) at least one diisocyanate,
(b) at least one polyesterdiol, and
(c) at least one bifunctional carboxylic acid selected from dihydroxy carboxylic acids and diamino carboxylic acids;

wherein the polyurethane has a glass transition temperature below 20° C., characterized in that the polyurethane either has no melting point above 20° C. or wherein the polyurethane has a melting point above 20° C. with an enthalpy of fusion lower than 10 J/g; wherein at least 80% by weight of the polyurethane is composed of at least one aliphatic polyesterdiol (b);

wherein a film of the polyurethane adhesive decomposes at home compost conditions to more than 90% by weight into $CO_2$ and water within 360 days;

wherein a material is biodisintegratable at home compost conditions if at most 10% of the original dry weight of the material is found to be present after aerobic composting at 25±5° C. for a period of at most 180 days in a sieve fraction >2 mm.

2. The method according to claim 1, wherein more than 80% by weight of the polyurethane is composed of
(a) at least one aliphatic diisocyanate,
(b) at least one aliphatic polyesterdiol,
(c) at least one bifunctional carboxylic acid selected from dihydroxycarboxylic acids and diaminocarboxylic acids, and
(d) at least one polyfunctional compound which differs from the monomers (a) to (c) and which has at least two reactive groups selected from primary and secondary amino groups.

3. The method according to claim 1, wherein at least 80% by weight of the at least one polyesterdiol (b) is composed of at least one aliphatic dicarboxylic acid and of at least one aliphatic diol.

4. The method according to claim 1, wherein the at least one polyesterdiol (b) is made of at least 10 mol %, based on the sum of diols used for making the polyesterdiol of branched aliphatic diols.

5. The method according to claim 1, wherein the polyurethane is composed of
a) at least one diisocyanate,
b) at least one diol, where, of these,
  $b_{1)}$ from 10 to 100 mol %, based on the total amount of the diols (b), are polyesterdiols with a molar mass of from 500 to 5000 g/mol,
  $b_{2)}$ from 0 to 90 mol %, based on the total amount of the diols (b), have a molar mass of from 60 to 500 g/mol,
c) at least one bifunctional carboxylic acid selected from dihydroxycarboxylic acids and diaminocarboxylic acids,
d) optionally other polyfunctional compounds which differ from the monomers (a) to (c) and which have reactive groups, where these are alcoholic hydroxy groups, primary or secondary amino groups, or isocyanate groups, and
e) optionally monofunctional compounds which differ from the monomers (a) to (d) and which have a reactive group which is an alcoholic hydroxy group, a primary or secondary amino group, or an isocyanate group.

6. The method according to claim 1, wherein the polyurethane dispersion adhesive comprises at least one external crosslinking agent.

7. The method according to claim 6, wherein the at least one external crosslinking agent has been selected from the group consisting of isocyanurates formed from diisocyanates and having at least two isocyanate groups, compounds having at least one carbodiimide group, chemically capped isocyanates, encapsulated isocyanates, encapsulated uretdiones, biurets, allophanates, aziridines, oxazolines, epoxides, and mixtures of the substances mentioned.

8. The method according to claim 1, wherein the material of the first substrate has been selected from lignin, starch, cellulose materials, polylactic acid, polyglycolic acid, aliphatic polyesters, aliphatic-aromatic copolyesters, polyhydroxyalkanoates, polypropylene carbonate, and mixtures of the materials mentioned, and the material of the second substrate has been selected from paper, lignin, starch, cellulose materials, polylactic acid, polyglycolic acid, aliphatic polyesters, aliphatic-aromatic copolyesters, polyhydroxyalkanoates, polypropylene carbonate, and mixtures of the materials mentioned.

9. The method according to claim 1, wherein a film of the polyurethane adhesive and/or the first and second substrates and/or the composite foil is home compostable, wherein a material is home compostable if it is biodisintegratable at home compost conditions (25±5° C.) and if it decomposes at home compost conditions to more than 90% by weight into $CO_2$ and water within 360 days; and wherein a material is biodisintegratable at home compost conditions if at most 10% of the original dry weight of the material is found to be present after aerobic composting at 25±5° C. for a period of at most 180 days in a sieve fraction >2 mm.

10. The method according to claim 1, wherein the composite foil is a part of a home compostable flexible packaging.

11. The method according to claim 1, wherein the at least one polyesterdiol (b) is made of at least 20 mol % based on the sum of diols used for making the polyesterdiol of branched aliphatic diols.

12. The method according to claim 11, wherein, wherein the branched aliphatic diols comprises neopentyl glycol.

* * * * *